United States Patent [19]

Miyamaru et al.

[11] Patent Number: 4,660,020

[45] Date of Patent: Apr. 21, 1987

[54] TURN SIGNAL CANCELLING APPARATUS FOR USE IN VEHICLES

[75] Inventors: Yukio Miyamaru, Tokyo; Kaoru Hatanaka, Saitama; Shigeo Kawada, Saitama; Yasuo Shibata, Saitama, all of Japan

[73] Assignee: Honda Giken Kogyo Kabushiki Kaisha, Tokyo, Japan

[21] Appl. No.: 800,711

[22] Filed: Nov. 22, 1985

Related U.S. Application Data

[62] Division of Ser. No. 417,878, Sep. 14, 1982.

[30] Foreign Application Priority Data

Sep. 16, 1981 [JP] Japan ................................ 56-145773

[51] Int. Cl.[4] ............................ B62J 3/00; B60Q 1/34
[52] U.S. Cl. ...................................... 340/134; 340/73; 340/56; 340/55
[58] Field of Search ....................... 340/55, 56, 62, 73, 340/134

[56] References Cited

U.S. PATENT DOCUMENTS 4,333,071  6/1982  Kira et al. .............................. 340/56

Primary Examiner—John W. Caldwell, Sr.
Assistant Examiner—Tyrone Queen
Attorney, Agent, or Firm—Irving M. Weiner; Joseph P. Carrier; Pamela S. Burt

[57] ABSTRACT

A turn signal cancelling apparatus for a vehicle having a handlebar and a blinker unit which is operable to be activated by a manual operation and is operable to be deactivated by a cancelling signal. The apparatus comprises a handlebar turning angle detecting arrangement which detects the turning angle of the handlebar and provides a signal when the return angle of the handlebar exceeds a specified degree following turning operation of the vehicle, at least one of a time measuring arrangement which measures the time which elapses after the blinker unit has been activated and provides a signal when the specified time has elapsed, and a distance measuring arrangement which measure the travel distance of the vehicle after the blinker unit has been activated and provides a signal when the specified travel distance has been exceeded, and an output arrangement which provides the turn signal cancelling signal in response to at least one of the aforesaid signals, thereby providing an appropriate timing for automatically cancelling the turn signal of the vehicle.

2 Claims, 7 Drawing Figures

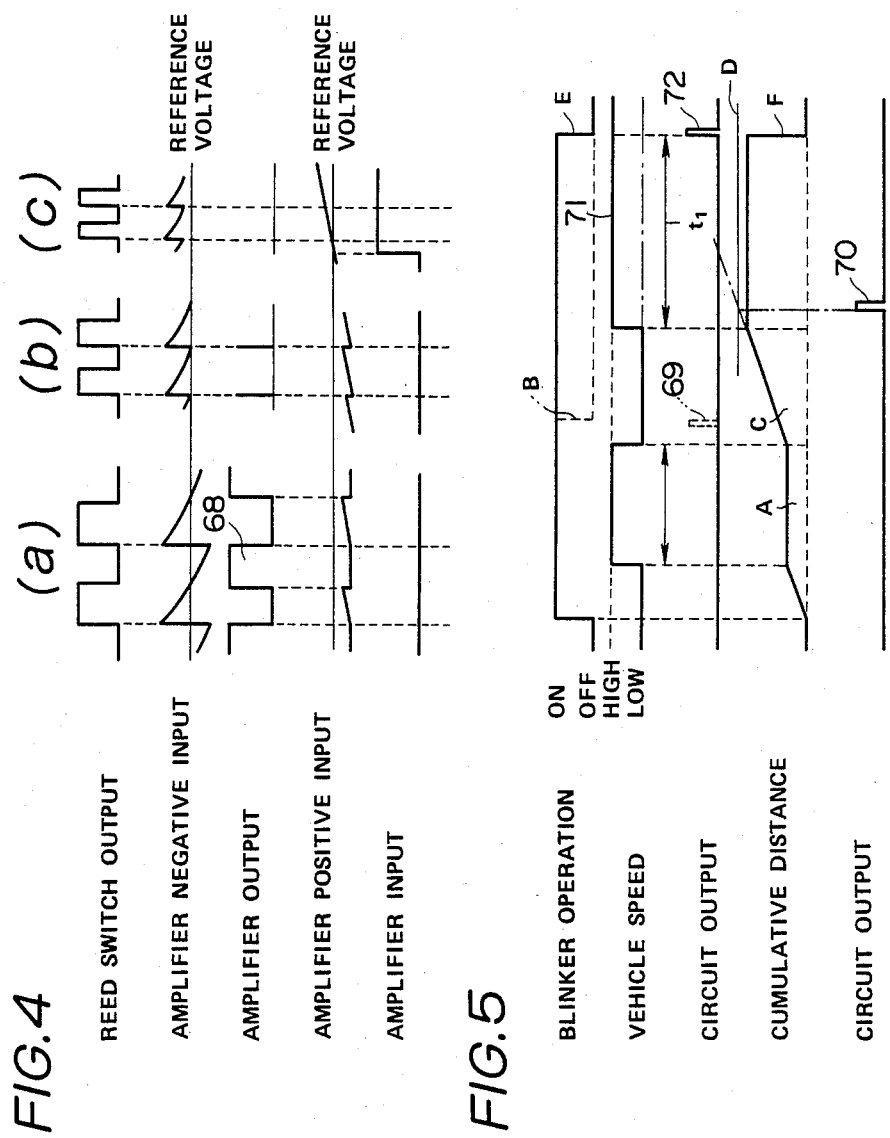

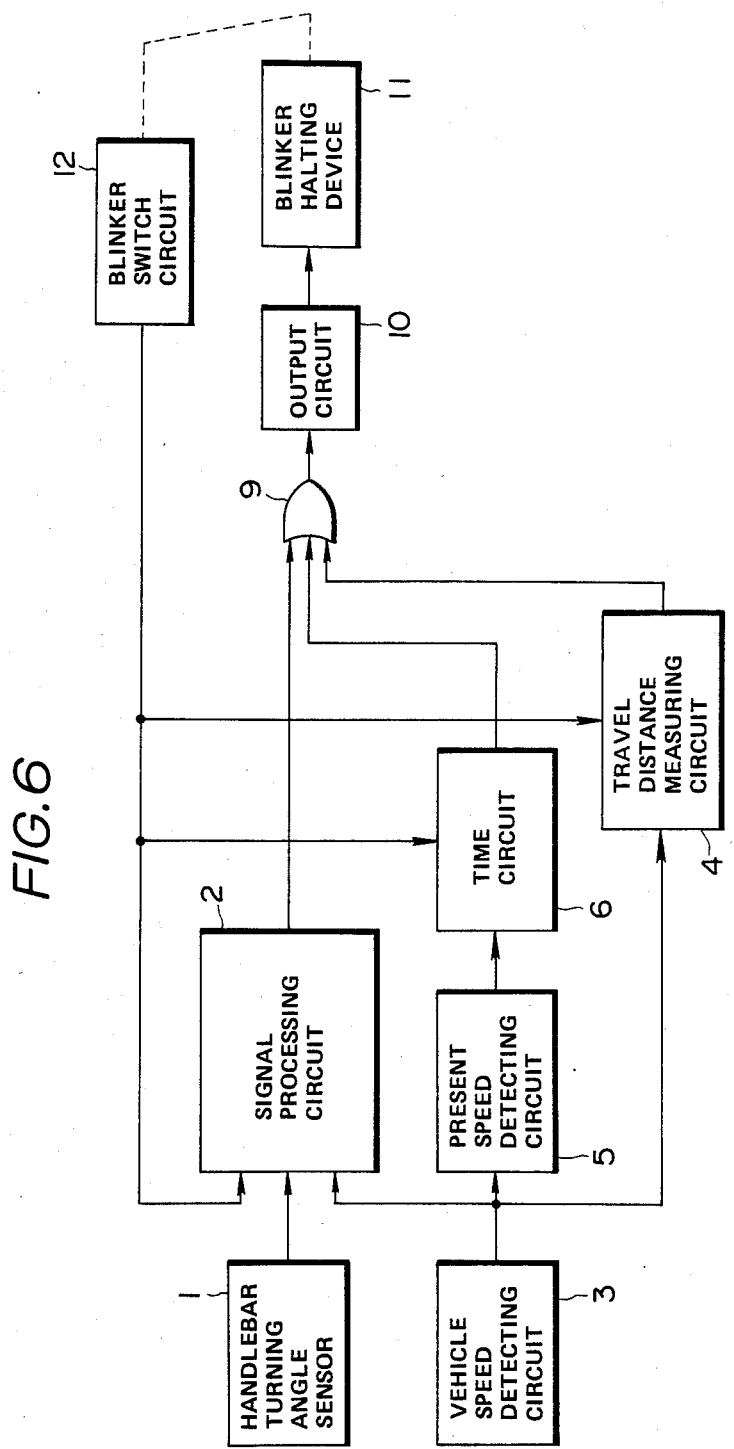

TURN SIGNAL CANCELLING APPARATUS FOR USE IN VEHICLES

This a divisional of application Ser. No. 417,878 filed Sept. 14, 1982.

BACKGROUND OF THE INVENTION

1. Field of the Invention

The present invention relates generally to a turn signal cancelling apparatus for use in a vehicle. More particularly, the invention relates to a turn signal cancelling apparatus which recognizes the end of a turning operation of the vehicle and deactivates the blinker unit.

2. Description of Relevant Art

When a motorcycle is to be provided with an automatic turn signal cancelling apparatus, various technical problems arise which are specific to a motorcycle and distinct from those encountered with a four-wheeled motor vehicle having a turning mechanism of the steering wheel type. Particularly, a motorcycle employs a handlebar which directly moves the front wheel, resulting in a small turning angle of the handlebar during the turning operation, and it is not easy to detect the variation in the handlebar turning angle. Such characteristic operation is particularly distinct when the motorcycle is turned at a high speed or is driven to make a lane change.

The present applicants have proposed an automatic blinker cancelling apparatus which operates by detecting the turning angle of the handlebar of the motorcycle. The present invention is an improved and advanced version of such automatic blinker cancelling apparatus based on consideration of the characteristics specific to a motorcycle as mentioned above.

SUMMARY OF THE INVENTION

The present invention provides, for a vehicle having a turning handlebar and a blinker unit which is operable to be activated by a manual operation and is operable to be deactivated by a cancelling signal, a turn signal cancelling apparatus comprising a turning angle detecting means for detecting the turning angle of the handlebar and providing a signal when the return angle of the handlebar exceeds the specified degree following the turning operation of the vehicle, at least one of a time measuring means for measuring the time which elapses after the blinker unit has been activated and provides a signal when the specified time has elapsed and a distance measuring means formeasuring the travel distance of the vehicle after the blinker unit has been activated and provides a signal when the specified travel distance has been exceeded, and an output means for providing the turn signal cancelling signal in response to at least one of the aforesaid signals.

An object of the present invention is to provide for a vehicle, particularly a motorcycle, a turn signal cancelling apparatus which operates to automatically deactivate the blinker unit with a proper timing after the vehicle has made a turn or made a lane change.

The above and further objects, details and advantages of the present invention will become apparent from the following detailed description of preferred embodiments of the invention, when read in conjunction with the accompanying drawings.

BRIEF DESCRIPTION OF THE DRAWINGS

FIG. 4 is a set of waveform diagrams for explaining the operation of the timer circuit employed in the control unit shown in FIG. 3.

FIG. 5 is a timing chart for explaining the operation of the turn signal cancelling apparatus shown in FIG. 1.

FIG. 6 is a block diagram showing a turn signal cancelling apparatus according to a second embodiment of the present invention.

DETAILED DESCRIPTION OF PREFERRED EMBODIMENTS

Figure 1:
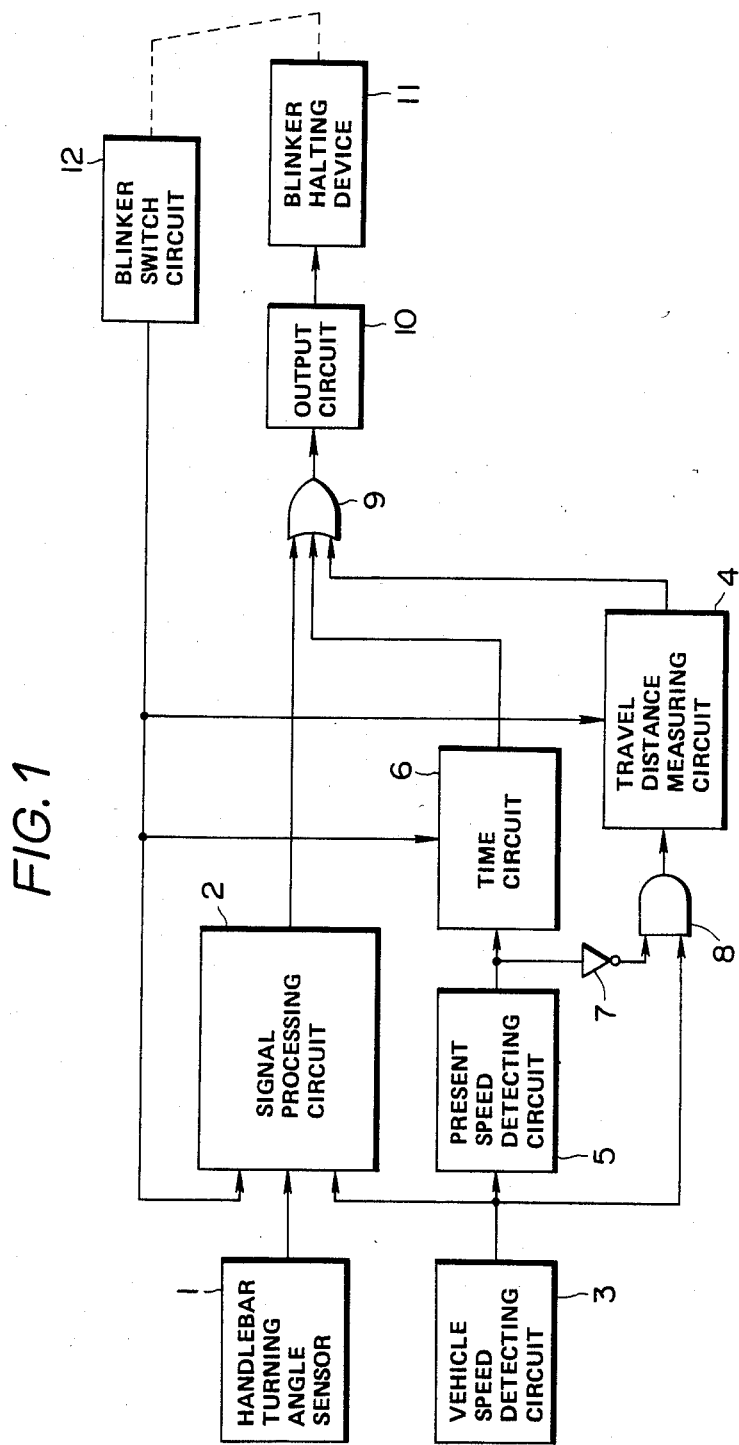
FIG. 1 is a block diagram showing a first embodiment of the turn signal cancelling apparatus according to the present invention.

With reference to FIG. 1, there is shown in block diagram form the general arrangement of a first embodiment of the turn signal cancelling apparatus according to the present invention. The apparatus is designed such that when the vehicle travels at a low speed (a speed lower than a preset speed), the turn signal cancelling signal is produced either through the arrangement including a handlebar turning angle sensor 1 and a signal processing circuit 2, or through the arrangement including a vehicle speed detecting circuit 3 and a travel distance measuring circuit 4. When the vehicle travels at a high speed ( a speed higher than or equal to the present speed), the turn signal cancelling signal is produced entirely through the arrangement including the vehicle speed detecting circuit 3, a present speed detecting circuit 5 and a timer circuit 6 upon expiration of the specified time following the activation of the blinker unit. The timer circuit 6 and the travel distance measuring circuit 4 do not receive the operative input signal at the same time, due to the connection of an inverter 7 and an AND gate 8. The output signals of the above-mentioned three arrangements are received by an OR gate 9 so that one of the three operation signals will operate on electrical returning means comprising an output circuit 10 and a blinker halting device 11 to bring a blinker switch circuit 12 into the off state.

Figure 2:
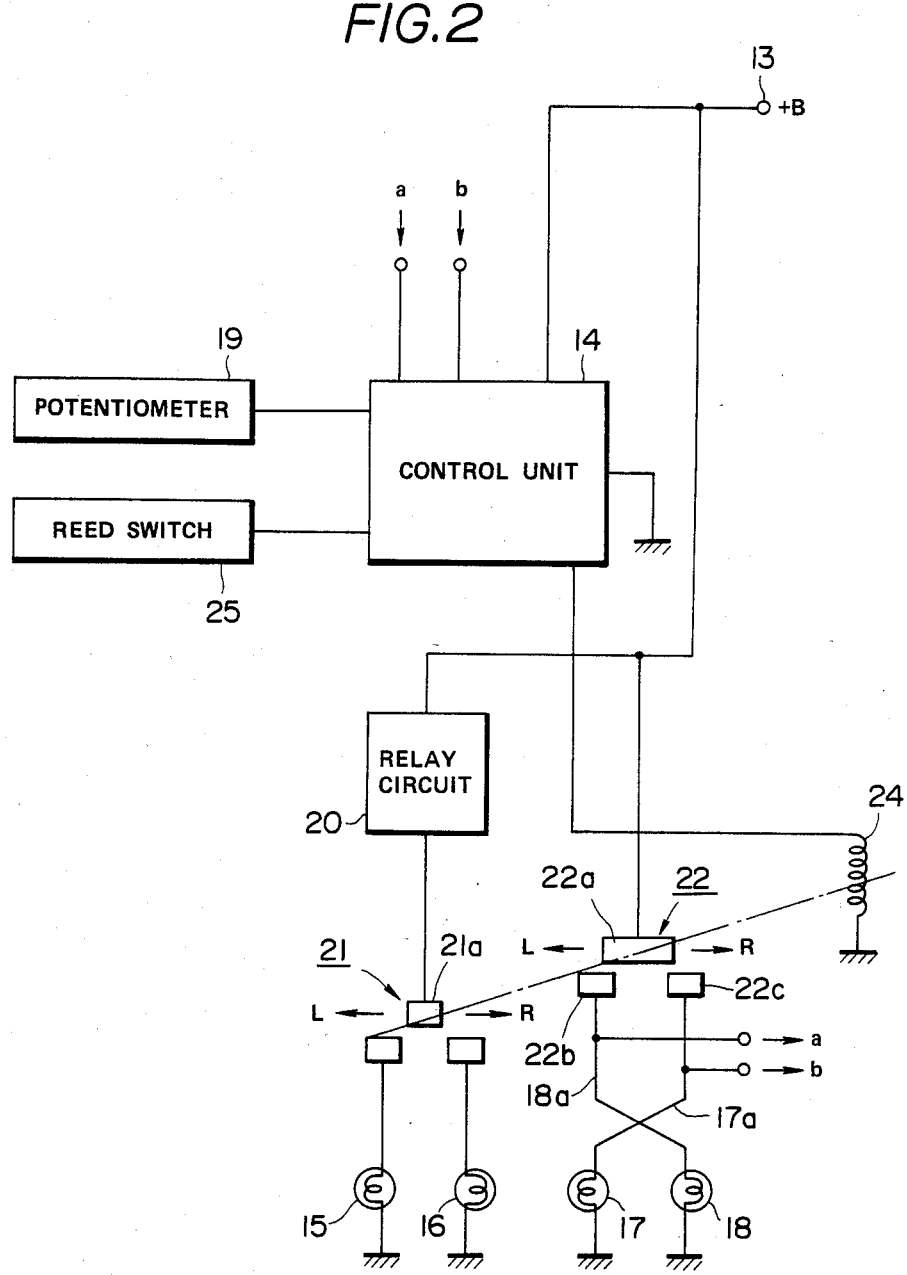
FIG. 2 is a block diagram showing the blinker system of a motorcycle with the turn signal cancelling apparatus of the present invention applied thereto.

FIG. 2 shows in block diagram form the blinker system for a motorcycle with the turn signal cancelling apparatus of FIG. 1 applied thereto. In FIG. 2, electric power from voltage source +B is supplied through a terminal 13 to a control unit 14, right and left blinker lamps 15 and 16, position lamps 17 and 18, and a potentiometer 19 which defines the handlebar angle sensor 1. The blinking operation of the blinker lamps 15 and 16 is carried out by a relay circuit 20, and the lamp to be operated is determined by the position of a movable contact 21a of a blinker switch 21 which defines the blinker switch circuit 12.

Figure 3:
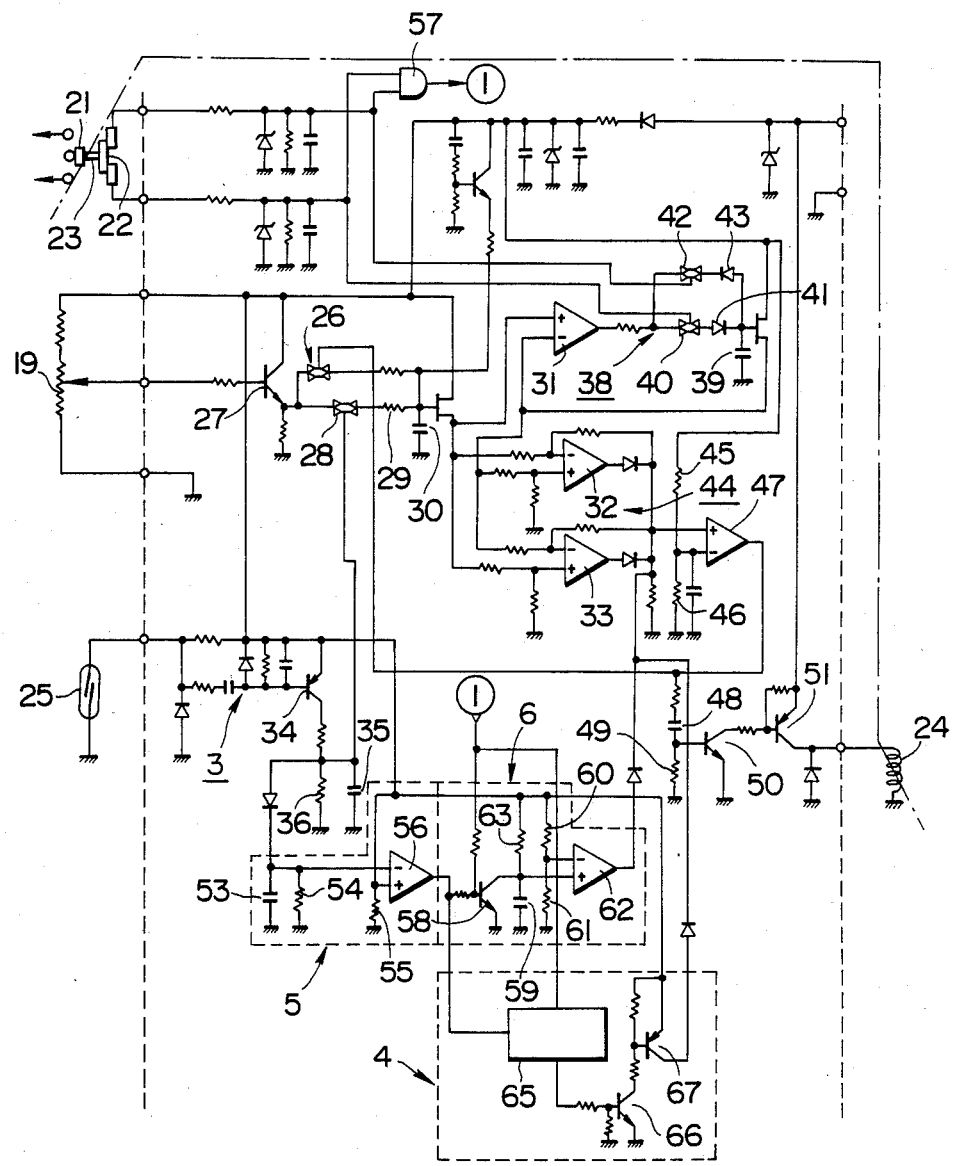
FIG. 3 is a schematic diagram of the control unit in the blinker system shown in FIG. 2.

The right and left position lamps 17 and 18 provided in correspondence to the blinker lamps 15 and 16 are continuously illuminated when the vehicle is travelling and at the same time when both of the blinker lamps 15 and 16 are not in blinking operation, so as to make other traffic aware of the approaching motorcycle. To this end, the position lamps 17 and 18 have a switch 22 in a cross connection as shown in FIG. 2 and the movable contact 22a thereof is located at the neutral position so as to be in contact with both fixed contacts 22b and 22c, thereby illuminating both lamps 17 and 18 when the vehicle moves straight ahead, while when the vehicle is going to be turned the movable contact 22a is moved to the right or left together with the movable contact 21a of the blinker switch 21 so that a position lamp 17 or 18 corresponding to the turning direction goes off. A pair of selection signals a and b representing the operational turning direction are provided through a pair of lines 17a and 18a connecting the position lamps 17 and 18 to the switch 22. The movable contact 21a of the blinker switch 21 and the movable contact 22a of the switch 22 are formed as separate portions of a unitary movable contact member 23 as shown in FIG. 3, and both the blinker switch 21 and the position lamp switch 22 are switched by driving the contact member 23 by a solenoid 24 which defines the blinker halting device 11. Further, the switches are returned to their neutral positions when a certain operation, such as a lane change for example, has been completed.

In the foregoing arrangement, the control unit 14 receives an analog signal from the potentiometer 19 which detects the handlebar turning angle, a pulse signal from a reed switch 25 which defines in part the vehicle speed detecting circuit 3 and provides a digital output representing the vehicle speed, and the signal pair a and b derived from the input line pair 17a and 18a for the position lamps 17 and 18. Then, the processing for automaticlly cancelling the blinking operation of the blinker lamp 15 or 16, which has been operated, is carried out inside the control unit 14.

The detailed circuit arrangement of the control unit 14 will be described with reference to FIG. 3. The potentiometer 19 is provided between the main body of the motorcycle and the handlebar section, with the sliding contact thereof being moved together with the handlebar so that a voltage corresponding to the position of the handlebar is produced. The output of the potentiometer 19 is fed to a noise suppressing circuit, i.e., an attenuating circuit 26, defining the signal processing circuit 2. The attenuating circuit 26 operates to attenuate the signal from the potentiometer 19 when the vehicle travels at a very low speed. This operation takes place by varying the apparent time constant of the circuit including a resistor 29 and a capacitor 30 by controlling the ON/OFF operation of a semiconductor switch 28 (e.g., a bilateral switch) provided on the output of a transistor 27 in accordance with the output signal from the speed detecting circuit 3.

More specifically, the speed detecting circuit 3 provides a pulse signal with its voltage level becoming high much more frequently, i.e., having a shorter period, when the vehicle speed is high, and with its voltage level becoming high less frequently, i.e., having a longer period, when the vehicle travels at a low speed. To this end, the switch element 28 which turns on in response to the high output of the speed detecting circuit 3 will be ON much more frequently at a higher vehicle speed and will be ON less frequently at a lower vehicle speed. Due to such operational characteristics of the switch 28, the time constant of the circuit made up of a resistor 29 and a capacitor 30 will apparently vary depending on the vehicle speed. At a low speed, the circuit has a large apparent time constant and approaches the intrinsic small time constant determined by the resistor 29 and capacitor 30 as the vehicle speed increases. Accordingly, the potentiometer signal received by the circuit 26 is substantially directly delivered to amplifiers 31, 32 and 33 when the vehicle travels at a high speed, while at a low speed the potentiometer signal is attenuated before being supplied to the amplifiers 31, 32 and 33.

For the speed detecting circuit 3, there is provided a reed switch 25 which is operated to be turned on and off by the attraction of a magnet mounted on a rotational part of the vehicle, and a transistor 34 is made conductive and non-conductive in response to the on/off operation of the reed switch 25. Then, a capacitor 35 is charged through the transistor 34 and discharged through a resistor 36 in response to the operation of the transistor 34 as to turn on and off the switch element 28 as described hereinabove and also to provide an operating signal for the present speed detecting circuit 5 as will be described hereinbelow. In the foregoing arrangement, the duration in which the switch element 28 stays ON is determined from the values of the resistor 36 and the capacitor 35.

The arrangement of FIG. 3 includes a peak holding circuit 38, which holds in a capacitor 39 thereof the peak voltage related to the maximum (or minimum) voltage given by the potentiometer 19 during the turning operation of the vehicle. The peak holding circuit 38 further includes a branch connection including a semiconductor switch 40 and a diode 41 and another branch connection including a semiconductor switch 42 and a diode 43, each connected between the output terminal of the amplifier 31 and the ungrounded terminal of the capacitor 39. The switch elements 40 and 42 are controlled selectively by the signals a and b derived from the lines 17a and 18a for the position lamps 17 and 18, and one of the switch elements 40 and 42 is made nonconductive in response to the operation of the blinker switch 21 corresponding to the turning direction of the vehicle. If only the switch element 40 is conductive, the voltage related to the maximum voltage from the potentiometer 19 is held, while if only the switch element 42 is conductive, the voltage related to the minimum voltage is held. These voltages represent the maximum and minimum handlebar turning angle during the turning operation.

When the vehicle moves straight ahead, the peak holding circuit 38 provides an output which is equal to the output of the circuit 26, and both outputs are supplied to amplifiers 32 and 33. On the other hand, when the vehicle is turned in one direction with the blinker switch 21 being operated, a voltage related to the maximum (or minimum) voltage supplied from the circuit 26 corresponding to the handlebar turning angle and held in the capacitor 39 is supplied to the inputs of the amplifiers 32 and 33. In other words, the differential amplifiers 32 and 33 which constitute a comparison circuit 44 receive on the input terminals thereof the output of the attenuating circuit 26 related to the output of the potentiometer 19 and the output of the peak holding circuit 38 so as to compare the output of the attenuating circuit 26 corresponding to the handlebar angle with the maximum (or minimum) voltage during the turning operation. Consequently, the amplifier 32 provides the difference between the output voltage from the circuit 26 and the maximum peak voltage, while the amplifier 33 provides the difference between the output voltage from the circuit 26 and the minimum peak voltage, and these differential outputs represent the handlebar return angles after the handlebar has been turned to the right and left, respectively, during the turning operation. The foregoing arrangement including the attenuating circuit 26, the peak holding circuit 38 and the comparison circuit 44 define the signal processing circuit 2 mentioned hereinabove. If one of the outputs of the amplifiers 32 and 33 becomes higher than the voltage predetermined by resistors 45 and 46, the output of the amplifier 47 becomes high, and such signal is an operation signal for cancelling the operation of the blinker lamps 15 and 16.

The output of the amplifier 47 is formed into a single pulse by the differentiation circuit made up of a capacitor 48 and a resistor 49. The pulse is amplified by transistors 50 and 51, and then applied to solenoid 24, the transistors 50 and 51 and the solenoid 24 together defining electrical returning means. The arrangement including the resistors 45 and 46 and the transistors 50 and 51 corresponds to the output circuit 10 in FIG. 1. When the solenoid 24 is momentarily energized by the pulse, it drives the contact member 23 so that the blinker switch 21 and the position lamp switch 22 are restored to the neutral position as described hereinabove. The operation of the circuit for cancelling the turn signal by utilization of the handlebar turning angle has now been described.

The following description relates to the operation of the circuit wherein the turn signal cancelling signal is produced upon expiration of the specified vehicle travel time following the turning operation. The timer circuit 6 is designed to operate when the vehicle makes a turn or a lane change during high speed travel as mentioned hereinabove, and to this end there is provided the preset speed detecting circuit 5 in front of the timer circuit 6. The preset speed detecting circuit 5 operates in response to the signal from the speed detecting circuit 3. More specifically, a capacitor 53 is charged when transistor 34 is made conductive and discharged through a resistor 54 repetitively. As the vehicle speed increases, causing the reed switch 25 for detecting the vehicle speed to produce a higher frequency output, the voltage across the capacitor 53 will rise. When the capacitor voltage comes to be in a steady state higher than the voltage determined by resistors 55a and 55b, i.e., when the vehicle speed exceeds the preset speed, the alternating output of the amplifier 56 stays at the low level [see FIG. 4(c)]. With the output of the amplifier 56 being low, if AND gate 57 produces a low output, transistor 58 in the timer circuit 6 is cut off and capacitor 59 starts charging. When the voltage across the capacitor 59 becomes higher than the voltage determined by resistors 60 and 61, amplifier 62 provides a high level output, and further if the output of the amplifier 62 becomes higher than the preset voltage determined by the resistors 45 and 46, the amplifier 47 provides the operation signal for cancelling the turn signal as described hereinabove.

When the vehicle speed is lower than the preset speed, the capacitor 59 is not charged sufficiently and the timer circuit 6 does not operate. When the vehicle moves straight ahead without operating the blinker lamps 15 and 16, the AND gate 57 keeps the high output, causing the transistor 58 to stay conductive, and the timer circuit 6 does not operate. In other words, when the blinker switch 51 is operated in either direction with the vehicle speed higher than the preset speed, the AND gate 57 provides a low output, allowing the transistor 58 to be cut off and then the capacitor 59 to be charged, and the timer circuit 6 operates. The setup time for the timer circuit 6 is determined from the values of resistor 63 and capacitor 59, and can be changed arbitrarily.

FIG. 4 shows the signal waveforms observed at the principal portions of the timer circuit 6 during the foregoing operation. Waveform set (a) includes from top to bottom the output of the reed switch 25, the input (at the negative input terminal) and output of the amplifier 56 and the input (at the positive input terminal) and output of the amplifier 62 observed when the vehicle travels at a low speed; waveform set (b) represents the case when the vehicle travels at the preset speed; and waveform set (c) represents the case when the vehicle travels at a high speed. It can be seen that the timer circuit 6 produces the operation signal only when the vehicle travels at a high speed. It is also possible to arrange the timer circuit so that it operates in a cumulative storing mode when the vehicle travels at a high speed.

Next, the operation of the travel distance measuring circuit 4 will be described. The distance measuring circuit 4 includes a counter 65 and two tandem-connected transistors 66 and 67. The input of the counter 65 is connected to receive the output of the present speed detecting circuit 5. With the counter 65 being set, when the vehicle makes a turn at a speed lower than the present speed, the amplifier 56 produces the rectangular pulse train 68 as shown in FIG. 4, which is counted by the counter 65, and when the count has reached the present value representing the present distance, the transistors 66 and 67 are made conductive, causing the amplifier 47 to produce the operation signal for cancelling the turn signal. If the amplifier 56 does not provide the pulse train, the counter 65 does not operate, and therefore, the distance measuring circuit 4 operates only when the vehicle travels at a speed lower than the preset speed. When the blinker lamps 15 and 16 are not in blinking operation, the counter 65 is reset by the output of the AND gate 57, and the distance measuring circuit 4 does not produce the operation signal.

In summary, the foregoing automatic turn signal cancelling apparatus has the following characteristic functions. First, when the vehicle is turned at a low speed with its handlebar being turned a relatively large degree, the turn signal cancelling signal is produced based on the detection of the handlebar turning angle, and when the vehicle travels at a low speed with its handlebar being turned a relatively small degree, the travel distance following the activation of the blinker switch 21 is measured by the distance measuring circuit 4 and the cancelling signal is produced after the vehicle has travelled the preset distance. Second, when the vehicle is turned at a high speed, the time which elapses following the activation of the blinker switch 21 is measured by the timer circuit 6 and the turn signal cancelling signal is produced upon expiration of the preset time. Thus, the handlebar turning angle detecting circuit 1 or the distance measuring circuit 4 operates when the vehicle travels slower than the preset speed, and the timer circuit 4 is primarily used to produce the turn signal cancelling signal when the vehicle travels faster than the preset speed.

FIG. 5 is a timing chart showing the general operation of the turn signal cancelling apparatus. First, when the blinker switch is activated at a low speed, the counter 65 operates to measure the travel distance. When the vehicle speed increases over the preset speed, the counter 65 halts the operation and retains the count (the operational state shown by A). At the time when the vehicle speed exceeds the preset speed, the timer circuit 6 starts operating, and if the time length in which the vehicle speed is in excess of the preset speed is longer than the preset time, the cancelling signal 69 is produced by the timer circuit 6 (the operational state shown by B). On the other hand, if the higher-speed time length is shorter than the preset time of the timer circuit 6, the circuit is reset and the cancelling signal is not produced. The counter 65 restarts operation when the vehicle speed decreases below the preset speed and measure the travel distance cumulatively (the operational state shown by C). If the measured distance exceeds the present value D, the cancelling signal 70 will be produced by the distance measuring circuit 4. However, if the vehicle speed increases again over the present speed 71, the timer circuit 6 restarts at this moment and produces the cancelling signal 72 upon expiration of the present time $t_1$, and the blinker unit is turned off as shown by E. Then, the distance measuring circuit 4 is reset as shown by F.

Figure 7:
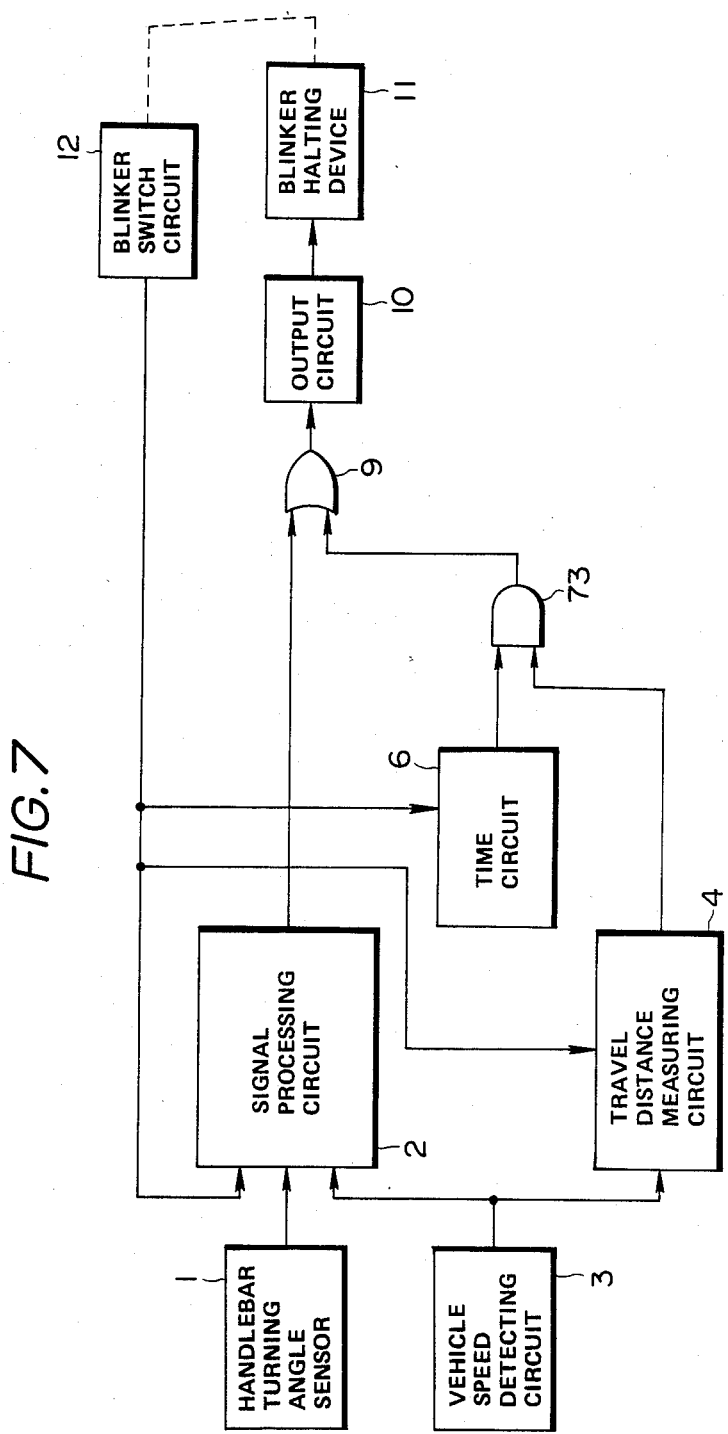
FIG. 7 is a block diagram showing a turn signal cancelling apparatus according to a third embodiment of the present invention.

The following description relates to the second and third embodiments of the present invention, with reference to FIGS. 6 and 7, respectively, wherein the same reference numerals designate the same portions shown in FIG. 1.

The arrangement of FIG. 6 is also provided with the combination of the arrangement including the signal processing circuit which receives the output of the sensor 1 for detecting the handlebar turning angle and the arrangement including the preset speed detecting circuit 5 and the distance measuring circuit 4. In this embodiment, both the arrangements operate concurrently when the vehicle travels at a speed higher than the preset speed and the turn signal cancelling signal is produced based on an operation signal which is issued earlier by one of the arrangements.

The embodiment of FIG. 7 is designed such that the timer circuit 6 and the distance measuring circuit 4 are activated when the blinker switch is operated, and an AND gate 73 is used to produce the turn signal cancelling signal when the preset values in both arrangements are exceeded or the cancelling signal is produced when the handlebar turning angle exceeds the preset value.

Although there have been described what are at present considered to be the preferred embodiments of the present invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

We claim:

1. A turn signal cancelling apparatus for use in a motorcycle having a turning handlebar, comprising:
   speed detecting means for providing a speed signal responsive to the speed of said motorcycle;
   handlebar turning angle detecting means providing an output signal responsive to the turning angle of said handlebar;
   switch means for controlling a pair of blinker lamps, said switch means being manually operable by a driver of said motorcycle and having selectable positions including a neutral position and a pair of operative positions for selectively activating said blinker lamps, said switch means providing a selection signal responsive to the selection of said positions;
   electrical returning means for driving said switch means to return from one of said operative positions to said neutral position;
   time measuring means for receiving said selection signal so as to provide an output signal responsive to the time elasped after said blinker lamp has been activated;
   distance measuring means for receiving said speed signal and said selection signal so as to provide an output signal responsive to the distance covered by said motorcycle after said blinker lamp has been activated;
   an AND gate for receiving said output of said time measuring means and said output of said distance measuring means so as to provide an output signal;
   an OR gate for receiving said output of said turning angle detecting means and said output of said AND gate so as to provide an output signal;
   said electrical returning means being connected with said OR gate for driving said switch means upon receipt of said output signals of said OR gate;
   said turning angle detecting means comprises a return angle detecting means for detecting the return angle of said handlebar by comparing the turning angle of said handlebar with the maximum turning angle of said handlebar after said blinker lamp has been activated; and
   said return angle detecting means has a peak holding circuit.

2. A turn signal cancelling apparatus for use in a motorcycle having a turning handlebar, comprising:
   speed detecting means for providing a speed signal responsive to the speed of said motorcycle;
   handlebar turning angle detecting means for providing an output signal responsive to the turning angle of said handlebar;
   switch means for controlling a pair of blinker lamps, said switch means being manually operable by a driver of said motorcycle and having selectable positions including a neutral position and a pair of operative positions for selectively activating said blinker lamps, said switch means providing a selection signal responsive to the selection of said positions;
   electrical returning means for driving said switch means to return from one of said operative positions to said neutral position;
   time measuring means for receiving said selection signal so as to provide an output signal responsive to the time elasped after said blinker lamp has been activated;
   distance measuring means for receiving said speed signal and said selection signal so as to provide an output signal responsive to the distance covered by said motorcycle after said blinker lamp has been activated;
   an AND gate for receiving said output of said time measuring means and said output of said distance measuring means so as to provide an output signal;
   an OR gate for receiving said output of said turning angle detecting means and said output of said AND gate so as to provide an output signal;
   said electrical returning means is connected with said OR gate for driving said switch means upon receipt of said output signals of said OR gate;

said turning angle detecting means comprises a return angle detecting means for detecting the return angle of said handlebar by comparing the turning angle of said handlebar with the maximum turning angle of said handlebar after said blinker lamp has been activated; and said return angle detecting means has a noise suppressing circuit.

* * * * *

UNITED STATES PATENT AND TRADEMARK OFFICE
CERTIFICATE OF CORRECTION

PATENT NO. : 4,660,020
DATED : April 21, 1987
INVENTOR(S) : Yukio MIYAMARU et al.

It is certified that error appears in the above-identified patent and that said Letters Patent is hereby corrected as shown below:

Column 1, line 52, change "formeasuring" to --for measuring--.
Column 2, line 36, change "present" to --preset--;
         line 39, change "present" to --preset--.
         line 44, change "connection" to --connections--.
Column 3, line 32, correct the spelling of --automatically--.
Column 4, line 18, change "present" to --preset--.
Column 6, line 25, change "present" to --preset--;
         lines 27-28, change "present" to --preset--.
         line 31, change "present" (both occurrences) to --preset--.
Column 7, lines 17-18, change "present" to --preset--;
         line 20, change "present" to --preset--.

Signed and Sealed this

First Day of September, 1987

Attest:

DONALD J. QUIGG

*Attesting Officer*      Commissioner of Patents and Trademarks